United States Patent
Nagy et al.

(10) Patent No.: US 12,013,704 B2
(45) Date of Patent: Jun. 18, 2024

(54) AUTONOMOUS VEHICLE CONTROL SYSTEM TESTING

(71) Applicant: Aurora Operations, Inc., Pittsburgh, PA (US)

(72) Inventors: Bryan John Nagy, Allison Park, PA (US); Robert Michael S Dean, North Bethesda, MD (US); Jian Wen, Pittsburgh, PA (US)

(73) Assignee: Aurora Operations, Inc., Pittsburgh, PA (US)

( * ) Notice: Subject to any disclaimer, the term of this patent is extended or adjusted under 35 U.S.C. 154(b) by 477 days.

(21) Appl. No.: 16/839,208

(22) Filed: Apr. 3, 2020

(65) Prior Publication Data

US 2020/0319651 A1 Oct. 8, 2020

Related U.S. Application Data

(60) Provisional application No. 62/829,583, filed on Apr. 4, 2019.

(51) Int. Cl.
*G05D 1/00* (2006.01)
*G01C 21/34* (2006.01)

(52) U.S. Cl.
CPC ....... *G05D 1/0221* (2013.01); *G01C 21/3407* (2013.01); *G05D 1/0088* (2013.01); *G05D 1/0217* (2013.01)

(58) Field of Classification Search
None
See application file for complete search history.

(56) References Cited

U.S. PATENT DOCUMENTS

| | | | | |
|---|---|---|---|---|
| 2017/0254728 | A1* | 9/2017 | Jang | G06F 11/3058 |
| 2018/0313724 | A1* | 11/2018 | Yang | G06V 20/56 |
| 2019/0370347 | A1* | 12/2019 | Levy | G06K 9/622 |
| 2020/0166361 | A1* | 5/2020 | Voznesensky | G05D 1/0088 |

* cited by examiner

*Primary Examiner* — Hongye Liang
(74) *Attorney, Agent, or Firm* — Schwegman Lundberg & Woessner

(57) ABSTRACT

Examples described herein are directed to systems and methods for autonomous vehicle control system testing. A testing utility may receive log data describing a first location of a capturing vehicle at a first driven route time and a second location of the capturing vehicle at a second drive route time. The testing utility may, using at least the location data, determine a first routing graph modification to constrain a navigator component of an autonomous vehicle control system under test. The testing utility may provide the first routing graph modification to the navigator component to cause the navigator component to generate a testing route.

20 Claims, 8 Drawing Sheets

AUTONOMOUS VEHICLE CONTROL SYSTEM TESTING

CLAIM FOR PRIORITY

This application claims the benefit of priority of U.S. Provisional Application Ser. No. 62/829,583, filed Apr. 4, 2019, which is hereby incorporated by reference in its entirety.

FIELD

This document pertains generally, but not by way of limitation, to devices, systems, and methods for operating and/or managing an autonomous vehicle.

BACKGROUND

An autonomous vehicle is a vehicle capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
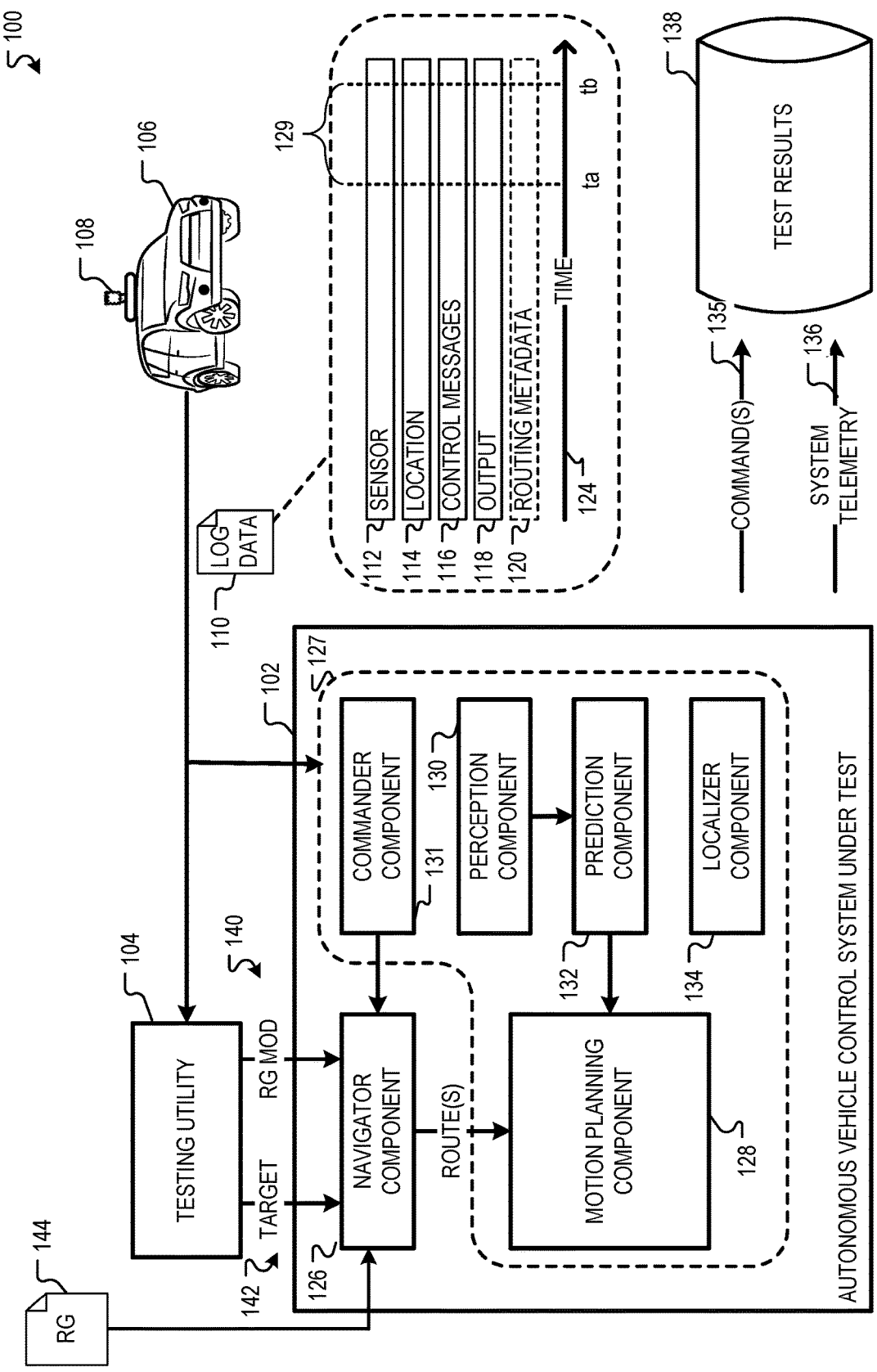
FIG. 1 is a diagram showing one example of an environment for testing an autonomous vehicle control system under test (AV SUT).

Examples described herein are directed to systems and methods for autonomous vehicle control system testing. An autonomous vehicle control system being tested is also referred to herein as an autonomous vehicle system under test (AV SUT).

In an autonomous or semi-autonomous vehicle (collectively referred to as an autonomous vehicle (AV)), an autonomous vehicle control system, sometimes referred to as an AV stack, controls one or more of braking, steering, or throttle of the vehicle. In a fully-autonomous vehicle, the autonomous vehicle control system assumes full control of the vehicle. In a semi-autonomous vehicle, the autonomous vehicle control system assumes a portion of the vehicle control, with a human user (e.g., a vehicle operator) still providing some control input. Some autonomous vehicles can also operate in a manual mode, in which a human user provides all control inputs to the vehicle.

In some examples, it is desirable to test an autonomous vehicle control system. A testing utility provides the AV SUT with log data that is captured by a capturing vehicle during a previously-executed trip. The log data can include, for example, sensor data captured by sensors at the capturing vehicle during the previously-executed trip. In examples where the capturing vehicle is an autonomous vehicle, the log data can also include message traffic between components of the autonomous vehicle control system of the capturing vehicle. The log data may also include location data describing the location of the capturing vehicle during the executed trip. The location data can include, for example, global positioning system (GPS) traces, driven route data indicating roadway elements traversed by the vehicle, or other suitable data indicating location.

To test the AV SUT, a testing utility replays the log data to provide simulated input to the AV SUT. For example, the testing utility provides the AV SUT, including various components thereof, with sensor data, component message traffic, etc., from the log data according to the timing by which the data was captured and/or created during the previously-executed trip. The AV SUT reacts to the replayed log data as it would if it were controlling an autonomous vehicle, for example, by generating message traffic and/or commands. Commands may be directed to vehicle controls such as steering, throttle, brakes, etc. The generated message traffic, commands, or other output may be stored and/or analyzed to evaluate the performance of the autonomous vehicle control system.

One challenge associated with testing autonomous vehicle control systems is that the navigator component of the AV SUT may not generate routes that match the driven route of the capturing vehicle on the executed trip. This can occur for various reasons. For example, the version of the navigator component of the AV SUT may be different than a version of the navigator component used by the capturing vehicle and may therefore generate different routes in some circumstances. Also, in some examples, the capturing vehicle may have been operated by a human driver and/or in a semi-autonomous mode when the log data was captured. The human driver may not make the same routing decisions as the navigator component 126.

Deviations between the route generated by the navigator component 126 of the AV SUT and the route driven by the capturing vehicle can cause test complications and even test failure. When the navigator component 126 generates a route, it provides the route to other downstream components of the AV SUT such as a motion planning component. The route generated by the navigator component 126 can be a new route and/or a substitution for or modification of a previous route. The other components of the AV SUT then modify their operation based on the received route.

If the navigator component 126 generates a route that deviates from the actual route driven by the capturing vehicle, it can cause a mismatch between the behavior of the AV SUT and the played-back log data. Consider an example in which the navigator component 126 generates a route that turns right at an intersection where the capturing vehicle proceeded straight. If this occurs, the AV SUT operates as though a right turn had occurred at the intersection but continue to receive log data consistent with driving straight through the intersection. This situation can lead to various problems such as corrupted test results or even a crash of the autonomous vehicle control system under test.

In various examples described herein, the testing utility is configured to generate navigator component inputs that cause the navigator component 126 to generate routes for the AV SUT that match the route actually driven by the capturing vehicle during the executed trip. In this way, the routes generated by the navigator component 126 and the other log data received by downstream components of the autonomous vehicle control system remains consistent during the test.

FIG. 1 is a diagram showing one example of an environment 100 for testing an AV SUT 102. The AV SUT 102 is configured to operate a self-driving vehicle (SDV) or autonomous vehicle (AV). For example, the AV SUT 102 may be configured to provide vehicle commands 135 to operate some or all the controls of an AV (e.g., acceleration, braking, steering). Example autonomous vehicle control systems are described in more detail herein, for example, with reference to FIG. 4.

In some examples, the AV SUT 102 is operable in different modes where the AV SUT 102 has differing levels of control over a vehicle in different modes. For example, the AV SUT 102 may be operable in a full autonomous mode in which the AV SUT 102 provides vehicle commands 135 to control all or most of the controls of an AV. In some examples, the AV SUT 102 is operable in a semiautonomous mode that is in addition to, or instead of, the full autonomous mode. In a semiautonomous mode, the AV SUT 102 provides vehicle commands 135 for some of the AV's controls while a human user or driver is responsible for other vehicle controls.

The AV SUT 102 may be arranged to provide vehicle commands 135 to an autonomous vehicle. As described herein, the AV SUT 102 may be executed in a test environment. For example, vehicle commands 135 provided by the AV SUT 102 may not be provided to actual vehicle controls. In some examples, vehicle commands 135 and system telemetry 136 including, for example, message traffic between the various components are stored at a test result data store 138 for later analysis. The AV SUT 102 can be executed on computing device hardware installed at an autonomous vehicle. For example, the AV SUT 102 may be disconnected at a hardware and/or software level such that vehicle commands 135 generated by the AV SUT 102 are not provided to the vehicle controls during testing. In other examples, the AV SUT 102 is executed in a bench environment, for example, on a server or other computing device that is not installed in a vehicle.

The AV SUT 102 comprises various components including, for example, a navigator component 126 and various downstream components. The navigator component 126 generates routes to be traversed by the vehicle. For example, the navigator component 126 receives routing graph data 144, target data 142, and routing graph modification data 140 and uses these data to generate routes.

Target data 142 describes an end point for routes to be generated by the navigator component 126. For example, target data 142 can describe a geographic location (e.g., latitude and longitude), a graph element, or any other suitable indication of location. In some examples, target data 142 also includes one or more waypoint locations that should be traversed on the way to a destination location.

Routing graph data 144 describes a routing graph used to generate routes. The routing graph is a graph that represents roadways as a set of graph elements. A graph element is a component of a routing graph that represents a roadway element on which the autonomous vehicle can travel. A graph element can be or include an edge, node, or other component of a routing graph. A graph element represents a portion of roadway, referred to herein as a roadway element. A roadway element is a component of a roadway that can be traversed by a vehicle.

A roadway element be or include different subdivisions of a roadway, depending on the implementation. In some examples, the roadway elements are or include road segments. A road segment is a portion of roadway including all lanes and directions of travel. Consider a four-lane divided highway. A road segment of the four-lane divided highway includes a stretch of the highway including all four lanes and both directions of travel.

In some examples, roadway elements are or include directed road segments. A directed road segment is a portion of roadway where traffic travels in a common direction. Referring again to the four-lane divided highway example, a stretch of the highway would include at least two directed road segments: a first directed road segment including the two lanes of travel in one direction and a second directed road segment including the two lanes of travel in the other direction.

In some examples, roadway elements are or include lane segments. A lane segment is a portion of a roadway including one lane of travel in one direction. Referring again to the four-lane divided highway example, a portion of the divided highway may include two lane segments in each direction. Lane segments may be interconnected in the direction of travel and laterally. For example, a vehicle traversing a lane segment may travel in the direction to travel to the next connected lane segment or may make a lane change to move laterally to a different lane segment.

The routing graph includes data describing directionality and connectivity for the graph elements. The directionality of a graph element describes limitations (if any) on the direction in which a vehicle can traverse the roadway element corresponding to the graph element. The connectivity of a given graph element describes other graph elements to which the autonomous vehicle can be routed from the given graph element.

Routing graph modification data 140 describes one or more routing graph modifications that are applied to the routing graph data 144 for generating routes. A routing graph modification is a change to a routing graph (e.g., a general-purpose routing graph) that reflects various factors including, for example, capabilities of the vehicle that is to execute a route, current roadway conditions, business policy considerations, and so on. A routing graph modification includes a graph element descriptor and a constraint.

A graph element descriptor is data describing one or more graph elements that are the subject of a routing graph modification. For example, a graph element descriptor can describe graph elements using one or more graph element properties. A graph element property is anything that describes a graph element and/or its corresponding roadway element. Example graph element properties include, for example, a unique identifier for the graph element, a roadway type of the corresponding roadway element (e.g., divided highway, urban street, etc.), a driving rule of the roadway element associated with the graph element (e.g., speed limit, access limitations), a type of maneuver necessary to enter, exit, and/or traverse the corresponding roadway element, whether the corresponding roadway element leads to a specific type of roadway element (e.g., dead end, divided highway, etc.), and so on.

A constraint is an action applied to graph elements at a routing graph that are described by the graph element descriptor of a routing graph modification. Example constraints that may be applied to a graph element include removing the graph element from the routing graph, modifying (e.g., removing) transitions to or from a graph element, changing a cost associated with a graph element or transitions involving the graph element, etc. Another example routing graph modification can include changing a required or recommended autonomous vehicle mode. For example, a graph element can be modified to indicate that an autonomous vehicle traversing the roadway element corresponding to the graph element should be operated in a semi-autonomous or manual mode.

Consider an example in which particular roadway elements are experiencing heavy traffic. In this example, the routing graph modification data 140 may include a graph element descriptor identifying the graph elements that correspond to the roadway elements experience heavy traffic and a constraint to be applied to the graph elements (e.g., an increase in the cost of traversing or transitioning to the graph elements). Consider another example in which the AV SUT 102 is of a type that is not able to traverse a particular roadway element or combination of roadway elements. A routing graph modification may include graph element descriptor data describing graph elements corresponding to roadway elements that cannot be traversed by the AV SUT 102 and a constraint indicating that connections between the indicated graph elements and the rest of the routing graph are to be severed. In this way, different AV SUT's 102 having different capabilities may be associated with different routing graph modifications. Consider another example in which a policy is implemented preventing the AV SUT 102 from controlling a vehicle into roadway elements of a particular type such as, for example, school zones. A policy-based routing grapy modification may raise the costs associated with the graph elements corresponding to these roadway elements and/or remove connectivity to the graph elements.

The navigator component 126 uses the received routing graph modification data 140 to generate a constrained routing graph by applying routing graph modifications described by the routing graph modification data 140 to the routing graph data 144 to generate the constrained routing graph. The navigator component 126 generates a route using the constrained routing graph and the target or targets described by target data 142. For example, the navigator component 126 may apply a path planning algorithm such as A*, D*, Focused D*, D* Lite, GD*, Dijkstra's algorithm, and so forth.

The AV SUT 102 includes downstream components 127 that directly or indirectly interact with the navigator component 126. For example, the AV SUT 102 may include a commander component 131. The commander component 131 is configured to generate target data 142 and routing graph modification data 140 when the AV SUT 102 is utilized in an autonomous vehicle. For example, the commander component 131 may generate target data 142 and routing graph modification data 140 in response to user input received, for example, from a user via a UI, from a dispatch system, and/or from other sources. In the arrangement shown in FIG. 1, however, the navigator component 126 receives the target data 142 and routing graph modification data 140 from the testing utility 104, described in more detail herein.

A localizer component 134 generates vehicle poses for the vehicle controlled by the AV SUT 102. For example, the localizer 134 can receive sensor data from vehicle sensors and/or from log data 110 as described herein. A perception component 130 receives sensor data and identifies objects in the range of the vehicle sensors. A prediction component 132 receives indications of detected objects from the perception component 130 and generates object trajectories indicating how the detected objects are likely to move.

A motion planning component 128 receives routes generated by the navigator component 126. The motion planning component 128, in some examples, also receives object prediction trajectories from the prediction component 132 described in more detail herein, to generate vehicle commands 135 to control the throttle, steering, brakes, and/or other controls of the vehicle.

The environment 100 also shows an example capturing vehicle 106. The capturing vehicle 106 can be a passenger vehicle, such as a truck, a car, a bus or other similar vehicle. The capturing vehicle 106 can also be a delivery vehicle, such as a van, a truck, a tractor trailer, and so forth. The capturing vehicle 106 may be an AV or SDV. In some examples, however, the capturing vehicle 106 is driven by a human driver.

The capturing vehicle 106 includes one or more remote detection sensors 108. Remote detection sensors 108 receive return signals from their surroundings. Return signals may be reflected from objects, such as the ground, buildings, trees, and so forth. Remote-detection sensors 108 include one or more active sensors, such as light imaging detection and ranging (LIDAR), radio detection and ranging (RADAR), and/or sound navigation and ranging (SONAR) that emit sound or electromagnetic radiation in the form of light or radio waves to generate return signals. Information about the surroundings of the vehicle is extracted from the return signals. In some examples, the remote-detection sensors 108 include one or more passive sensors that receive return signals that originated from other sources of sound or electromagnetic radiation. The capturing vehicle 106 may also include other types of sensors, for example, as described in more detail herein.

The capturing vehicle 106 executes a trip and generates log data 110 from the executed trip. The log data 110 is captured over time. For example, data elements at the log data 110 are associated with capture times indicating the time during the executed trip at which the individual data elements were captured. Log data 110 can be associated with absolute times, such as a date and time, and/or may be associated with a reference time (e.g., the start of the executed trip).

The association between log data and capture times can be expressed in various suitable ways. For example, some log data 110, such as commands to vehicle controls and messages between navigator system components, can be associated with timestamps. Also, for example, some log data 110, such as remote detection sensor data, can be formatted as a data stream having a known frequency. For example, a LIDAR remote detection sensor may provide continuous remote detection sensing data that repeats a scan around the vehicle at a period corresponding to the rotational period of the LIDAR sensor.

In some examples, log data 110 is organized into channels 112, 114, 116, 118, 120 with different channels including different types of data. In the example of FIG. 1, an association between the various channels 112, 114, 116, 118, 120 and time is shown relative to a time axis 124. For example, channels 112, 114, 116, 118, 120 may have different channel positions corresponding to different time values on the time axis 124. For example, the various channels 112, 114, 116, 118, 120 can be associated with a stack, queue, or other suitable data structure at a memory or other data storage medium where different positions in the data structure corresponding to different time values. Although various examples describe log data 110 organized into channels 112, 114, 116, 118, 120, it will be appreciated that some embodiments may utilize log data 110 organized according to different channels or using another organization method.

In the example of FIG. 1, a sensor channel 112 includes sensor data captured by the capturing vehicle 106 during the executed trip. Sensor data stored at the sensor channel 112 can include data from a remote detection sensor of the capturing vehicle 106, such as, for example, a LIDAR, a SONAR, a RADAR, a set of stereoscopic cameras, etc. Sensor data stored at the sensor channel 112 may also include data from other sensors such as, for example, an inertial measurement unit (IMU). Although only one sensor channel 112 is shown in FIG. 1, in some examples, log data 110 can include multiple different channels for sensor data from different sensors. For example, remote detection sensor data may appear on one channel, IMU data may appear on a second channel, and so on.

A location channel 114 includes location data indicating the location of the capturing vehicle 106 over time 124 during the executed trip. Location data can be in any suitable format. In some examples, location data includes GPS traces indicating the location of the capturing vehicle 106. In some examples, the location data includes pose data or other outputs of a localizer component 134. In other examples, location data includes a roadway element or elements where the capturing vehicle 106 is present over time 124 during the trip.

A control messages channel 116 includes control message traffic between the various components of an autonomous vehicle control system at the capturing vehicle 106. These can include, for example, route messages sent from the navigator component 126 to the motion planning component 128, object messages indicating objects sensed by the perception component 130, or object prediction messages describing predictions for the movement of detected objects made by the prediction system 132. Message traffic can also include pose messages from the localizer component 134. In some examples, the log data 110 may have multiple control message channels such as, for example, different channels for messages to or from different autonomous vehicle control system components or combinations of components. For example, a navigator component (similar to the navigator component 126 of the AV SUT 102) may have an associated channel for providing route data. A motion planning component (similar to the motion planning component 128) may subscribe to the channel for route data.

An optional command channel 118 includes commands to the vehicle controls. The command channel 118 and associated vehicle commands 135 may be present, for example, when the capturing vehicle 106 is an autonomous vehicle and when the log data 110 is captured while the capturing vehicle 106 is operating in an autonomous mode. When the capturing vehicle 106 is not an autonomous vehicle and/or is not being operated in an autonomous mode, the command channel 118 and/or command data may not be present. In some examples in which the capturing vehicle 106 is operated in an autonomous mode for portions of the executed trip and a manual mode for other portions of the executed trip, portions of the log data 110 corresponding to times in which the capturing vehicle 106 was operated in autonomous mode may include command data, and portions of the log data 110 corresponding to times in which the capturing vehicle 106 was operated in manual mode may not include command data.

The environment 100 also includes a testing utility 104. The testing utility 104 may execute at the same computing device executing the AV SUT 102 and/or at a different computing device or devices. The testing utility 104 is configured to receive the log data 110 and generate routing metadata. Routing metadata describes the route that the capturing vehicle 106 traversed during the executed trip. In some examples, the testing utility 104 utilizes location data, for example, stored at the location channel 114, to generate the routing metadata. In some examples, this includes converting GPS traces from the location data into a set of graph elements that were traversed. In some examples, the testing utility 104 stores generated routing metadata at an additional routing metadata channel 120 of the log data 110. The routing metadata channel 120 can be associated with the time axis 124, for example, in a manner similar to that described herein with respect to the other channels 112, 114, 116, 118.

Routing metadata can be expressed positively, for example, as a description of where the capturing vehicle 106 was located during the executed trip. Positively-expressed routing metadata, in this way, may be different from the routing graph modifications described herein. For example, a routing graph modification relates to locations where a vehicle is not permitted to go (e.g., if the routing graph modification removes connectivity between graph elements) or locations where the vehicle can go, but with increased cost (e.g., if the routing graph modification increases the cost of traversing a graph element or traversing between graph elements). In some examples, positively-expressed routing data may take up less storage space than data describing routing graph modifications or other data describing where the capturing vehicle 106 was not during the executed trip. For example, positively-expressed routing metadata may take up less storage space than data expressed in terms of constraints. Although the savings in data storage may be small for a single set of log data 110, when log data from many executed trips is considered, data storage savings can be considerable.

In some examples, routing metadata is generated by converting location data to driven route data. For example, as described herein, location data may include various different kinds of data such as GPS traces, vehicle poses determined by a localizer component 134, sets of roadway elements traversed, etc. In some examples, the testing utility 104 generates routing metadata by converting location data from various formats into an indication of a driven route driven by the capturing vehicle 106 during all or part of the executed trip. This can include, for example, executing a roadway element associator routine that generates roadway elements corresponding to GPS traces, localizer-generated poses, etc. The driven route data can include, for example, a sequence of graph elements, a sequence of geographic locations (e.g., latitude and longitude), or another suitable format.

In some examples, a single location described by the location data corresponds to more than one roadway element/graph element, where the roadway elements are part of a common roadway. For example, a GPS trace or other element of location data may not have a suitable resolution to correspond to a single roadway element or may be "on the line" between two roadway elements. In these cases, for example, all of the roadway elements corresponding to the location data may be considered part of the driven route.

The testing utility 104 is also configured to support playback of all or a portion of the log data 110 at the AV SUT 102, for example, to test the functionality of the AV SUT 102. In some examples, the testing utility 104 includes two components, a first component for processing log data 110 and generating routing metadata and a second component for generating playback routing data during playback. Two components can be executed on the same computing device and/or on different computing devices.

The portion of the log data 110 played back to the AV SUT 102 is referred to herein as a log data portion 129. In the example of FIG. 1, the log data portion 129 is less than all of the log data 110, corresponding to the indicated times on the time axis 124. In other examples, the log data portion 129 can include all or most of the log data 110.

The testing utility 104 provides the log data portion 129 to the AV SUT 102 in a manner that simulates all or part of the executed trip. The testing utility 104 may provide the log data portion 129 to the AV SUT 102 at a time that corresponds to the timing of the log data portion 129 within the executed trip. In the example of FIG. 1, the log data portion 129 begins at a first time $t_a$ and ends at a second time $t_b$. The difference between $t_a$ and $t_b$ is the duration of the log data portion 129. During a playback of the log data portion 129, the log utility provides the log data portion 129 between $t_a$ and $t_b$ for a duration that may correspond to the difference between $t_a$ and $t_b$. For example, log data association with $t_a$ may be provided to the AV SUT 102 first, followed by log data associated with $t_a+1$ and so on until log data 110 associated with $t_b$ is provided.

During playback, different kinds of data from the log data 110 is provided to different components of the AV SUT 102. For example, sensor data may be provided to the perception component 130 for detecting objects from remote sensing data and/or to the localizer component 134 for generating vehicle poses.

The testing utility 104 generates playback-routing data and provides the playback-routing data to the navigator component 126. The playback-routing data may include, for example, target data 142 and routing graph modification data 140. Target data 142 describes a route end location where the AV SUT 102 is to navigate. Routing graph modification data 140 describes routing graph modifications that are to be applied by the navigator component 126. During playback, any target data 142 and/or routing graph modification data 140 that may be included in the log data portion 129 and/or generated by the commander component 131 may be held from the navigator component 126. Instead, the navigator component 126 receives target data 142 and routing graph modification data 140 generated by the testing utility 104 as described herein.

The testing utility 104 can be configured to generate the target data 142 and routing graph modification data 140 from the log data 110 including, for example, from the location data stored at the location channel 114 of the log data 110 and/or from routing metadata stored at the routing metadata channel 120 of the log data 110. The testing utility 104 generates target data 142 and routing graph modification data 140 that causes the navigator component 126 to generate test route data for the motion planner that matches the route actually traveled by the capturing vehicle 106. In some examples, this includes generating routing graph modification data 140 including routing graph modifications that break connectivity between graph elements corresponding to the roadway elements traveled by the capturing vehicle 106 and graph elements corresponding to the roadway elements not traveled by the capturing vehicle 106. In this way, the navigator component 126 is constrained to generate routes for the motion planning component 128 that do not deviate from the route driven by the capturing vehicle 106 during the executed trip.

The particular form of the target data 142 and routing graph modification data 140 can be generated, in some examples, based on the particular navigator component 126 that is used. For example, the target data 142 and routing graph modification data 140 can be placed in a form that the particular navigator component 126 is configured to receive and process, for example, from the commander component 131.

Figure 2:
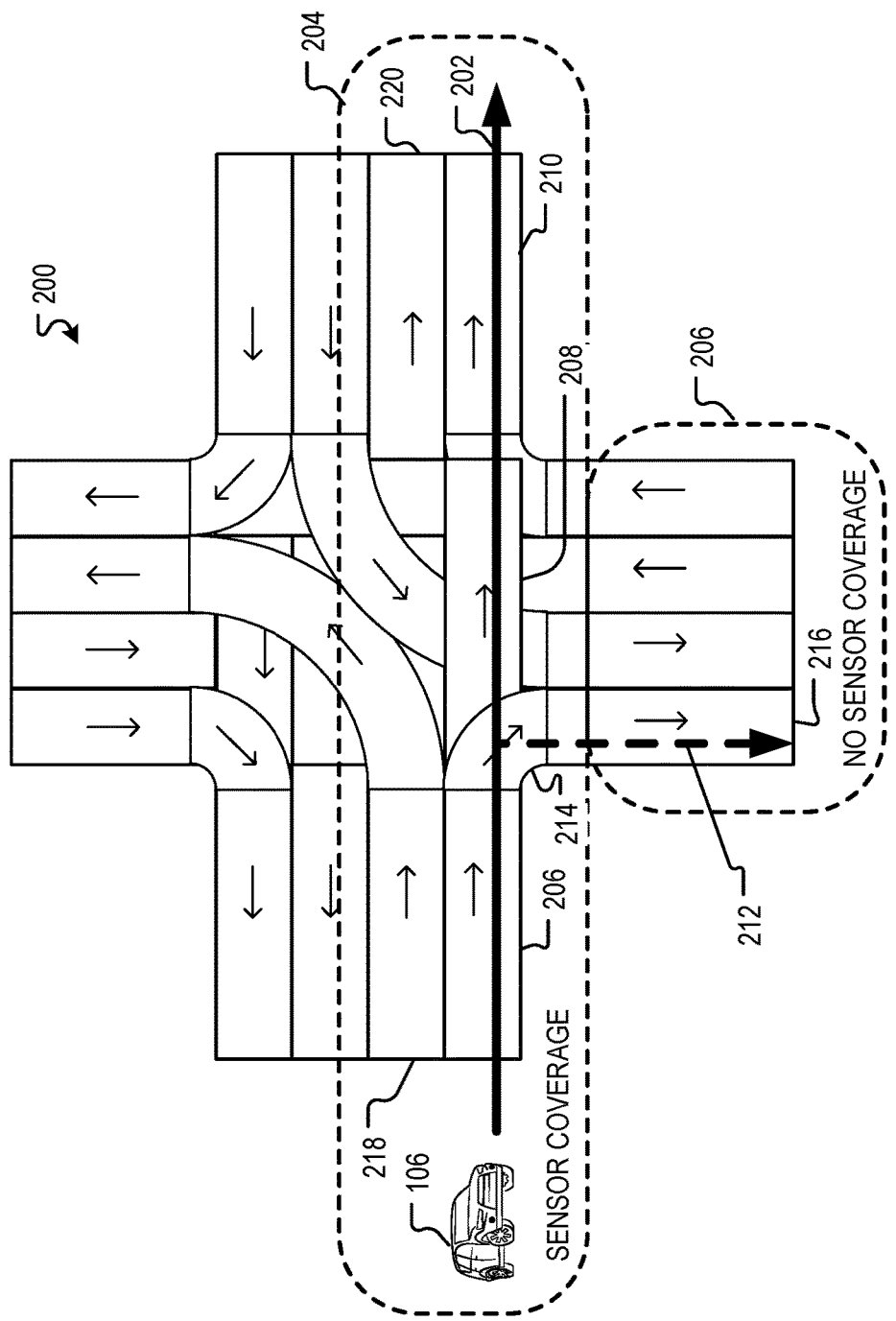
FIG. 2 shows an example routing graph portion illustrating a route generated by a navigator component of an AV SUT in response to playback routing data generated by a testing utility.

FIG. 2 shows an example routing graph portion 200 illustrating a route 202 generated by the navigator component 126 in response to playback routing data generated by the testing utility 104. The routing graph portion 200 may correspond to a log data portion, such as the log data portion 129.

The routing graph portion 200 includes some or all of a routing graph representing the roadways in a geographic area. The routing graph portion 200 represents the roadways as a set of graph elements, illustrated in in FIG. 2 as boxes or shapes. The routing graph portion 200 can include data that indicates directionality, connectivity, and cost for various graph elements corresponding to the roadway elements making up the roadways. Directionality indicates the direction of travel in a roadway element. Connectivity describes roadway element connections indicating possible transitions between roadway elements. Cost describes a cost for a vehicle to traverse a roadway element and/or traverse between two different roadway elements. Cost can be expressed, for example, in time, risk, etc. Graph elements are indicated in FIG. 2 as shaped sections, with the directionality of the corresponding roadway elements indicated by the illustrated arrows.

In the example of FIG. 2, the log data portion 129 describes a portion of the executed trip in which the capturing vehicle 106 followed the route 202. In this example, the capturing vehicle 106 traversed from graph element 206 to graph element 208 and to graph element 210. FIG. 2 also shows an example sensor coverage area 204. The sensor coverage area 204 illustrates the area from which the capturing vehicle 106 gathers sensor data while following the route 202. FIG. 2 also indicates an alternate route 212. The alternate route 212 begins at graph element 206 and turns right at graph element 214, proceeding to graph element 216. As shown, however, graph element 216 corresponds to a roadway element that is outside of the sensor coverage 204 of the corresponding log data portion 129. Accordingly, if the navigator component 126 of the AV SUT 102 were to generate the alternate route 212 during playback of the log data portion 129, the playback would be compromised because the motion planner 128 would be instructed to route to a location for which the log data portion 129 includes no sensor data.

The testing utility 104 can generate routing graph modification data 140 including routing graph modifications that exclude graph elements that are not part of the route 202. This can include, for example, removing connectivity at the routing graph portion 200 between graph elements 206, 208, 210 on the route 202 and other graph elements, such as 214 and 220, that are not part of the route 202. In some examples, instead of removing connectivity, the routing graph modification data 140 can include routing graph modifications that raise the cost of traversing graph elements off of the route 202 and/or connecting to components off of the route 202 to a cost that makes it unlikely that the navigator component 126 will generate routes to those graph elements off of the route 202.

The testing utility 104, in different examples, can be configured to generate wide or narrow playback routing data. Narrow playback routing data can include target data 142 and routing graph modification data 140 that closely or, in some examples, exactly follows the route 202 taken by the capturing vehicle 106. Broad playback routing data constrains the navigator component 126 to generate routes that can deviate from the route 202 taken by the capturing vehicle 106. For example, broad playback routing data may permit the navigator component 126 to generate routes that "change lanes" relative to the route 202 driven by the capturing vehicle 106. For example, referring to FIG. 2, example broad playback routing data may permit the navigator component 126 to generate routes that traverse graph elements 218 and 220. When the navigator component 126 routes to a permitted graph element that was not traversed by the capturing vehicle 106, the testing utility 104 may shift sensor data accordingly before it is provided to other components of the AV SUT 102.

Figure 3:
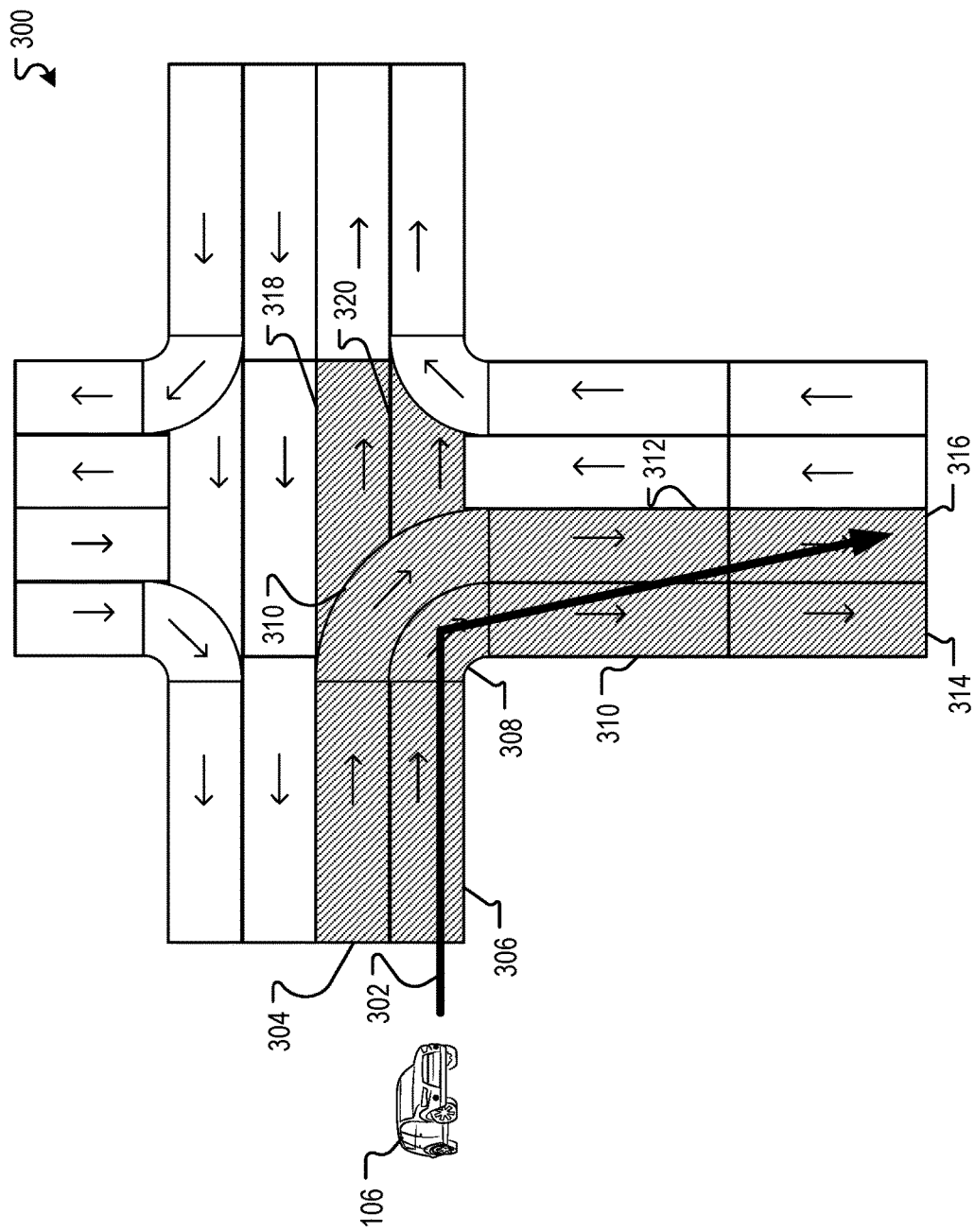
FIG. 3 is a diagram showing another example of a routing graph portion showing a route traveled by the capturing vehicle to generate a log data portion, such as the log data portion.

FIG. 3 is a diagram showing another example of a routing graph portion 300 showing a route 302 traveled by the capturing vehicle 106 to generate a log data portion, such as the log data portion 129. In this example, the capturing vehicle 106 proceeded from graph element 306 to graph element 308 to graph element 310 and to graph element 316. In this example, however, the testing utility 104 generates a playback routing data permitting the navigator component 126 to generate routes including additional graph elements 304, 318, 310, 312, 314, and 320.

In some examples, the testing utility 104 is configured to generate playback routing data that permits the navigator component 126 to generate routes on graph elements on the route 202 driven by the capturing vehicle 106 and also other graph elements that overlap graph elements on the route 202 driven by the capturing vehicle 106. For example, referring to FIG. 2, the testing utility 104 may generate routing graph modification data 140 that permits the navigator component 126 to route to graph element 214, which overlaps graph element 208. The routing graph modification data 140 may break the connection between graph element 214 and graph element 216, making it unlikely that the navigator component 126 will route to the graph element 214.

An example of the navigator component 126 generating playback routing data (e.g., routing graph modification data 140) with overlapping graph elements is also shown in FIG. 3. Here, the navigator component 126 generates routing graph modification data 140 that does not block the navigator component 126 from generating routes including graph elements 310 and 312 even though a route including these graph elements would deviate from the route 302 traveled by the capturing vehicle 106.

Generating playback routing data with overlapping graph elements, as shown in FIGS. 2 and 3, may make the testing utility 104 more robust. For example, it may be difficult for the testing utility 104 to distinguish overlapping graph elements when converting location data from the log data 110 to routing metadata. Including all overlapping graph elements may mitigate this difficulty. For example, the testing utility 104 may generate routing metadata that considers graph elements indicated by the location data without distinguishing between those that are on the driven route 302 of the capturing vehicle 106 and those that are not.

In some examples, the testing utility 104 is also configured to fill in gaps in location data and/or routing metadata. For example, location data included with the log data 110 may include gaps, low-quality poses, or other deficiencies that cause the testing utility 104 to fail to identify all of the graph elements that are part of the route 302 traversed by the capturing vehicle 106. When generating playback routing data, the testing utility 104 is configured to add graph elements that fill in any gaps. For example, referring to FIG. 2, if location data and/or routing metadata omits graph element 208, the testing utility 104 may be configured to add connecting graph elements 214 and 208 for consideration by the navigator component 126. Adding the graph elements 214, 208 may include refraining from generating routing graph modifications that remove connectivity to those graph elements.

In some examples, the testing utility 104 is configured to detect events in the log data 110 and generate log data portions, such as the log data portion 129 around the detecting events. In some examples, the testing utility 104 extends log data portions 129 to begin prior to an event start time of an event and end after an event end time of an event. Beginning a log data portion 129 at a log data portion start time prior to an event start time may allow the testing utility 104 to generate playback routing data during playback sufficient to allow the navigator component 126 of the AV SUT 102 to generate a route and settle before the log data 110 corresponding to the detected event occurs. The testing utility 104 may begin a log data portion 129 at any suitable interval prior to an event start time including, for example, 5 seconds before, 10 seconds before, etc.

Also, extending the log data portion 129 after an event end time may allow the navigator component 126 to generate a route that continues beyond the event end time. For example, if the log data portion 129 were to end at the event end time, the navigator component 126 may generate instructions to slow a vehicle prior to reaching the event end time, which may compromise the way that the AV SUT 102 processes the event. The testing utility 104 may end a log data portion 129 at a log data end time that is any suitable interval after an event end time including, for example, between about 20 seconds and about 120 seconds.

In some examples, the testing utility 104 is also configured to detect route loops in the driven route executed by the capturing vehicle 106 on the executed trip. A route loop occurs when the capturing vehicle 106 traverses the same roadway element or roadway elements twice. Route loops can cause challenges when log data 110 from an executed trip is played back to the AV SUT 102. For example, the testing utility 104 guides the navigator component 126 to generate routes matching the driven route using routing graph modification data 140 and routing graph modifications that tell the navigator component 126 where it should not route.

Causing the navigator component 126 to limit its routing to graph elements corresponding to roadway elements on the driven route tends to cause the navigator component 126 to generate routes that match the driven route of the capturing vehicle 106. When the driven route has a route loop, however, there may be more than one way that the navigator component 126 can route while still complying with the received routing graph modifications. For example, the navigator component 126 may generate a route that traverses the looped graph elements once and then proceed to the target location. Accordingly, the AV SUT 102 may determine that it has reached the target location while log data 110 from the considered log data portion 129 continues.

To address this, the testing utility 104 can implement route chunking. According to route chunking, the testing utility 104 detects route loops in the driven route. The detection may be performed for all log data 110 generated on an executed trip and/or for a log data portion, such as the log data portion 129. The testing utility 104 can detect route loops, for example, by detecting locations that appear in the routing metadata twice. If a route loop is detected, the testing utility 104 can break a log data portion 129 into multiple log data portions such that neither portion includes a route loop. For example, the testing utility 104 may split a log data portion 129 between a first and a second time that looped graph elements appeared on the driven route. A first log data sub-portion may be described by playback routing metadata including routing graph modification data 140 and target data 142 indicating a location on the driven route corresponding to where the previous log data portion is split. A next log data sub-portion may be described by second playback routing metadata including routing graph modification data 140 and target data 142 indicating the target location for the pre-split log data portion.

In some examples, instead of generating two log data sub-portions, the testing utility 104 may instruct the navigator component 126 to route to a waypoint between the first and the second appearance of the looped roadway elements on the driven route.

Figure 4:
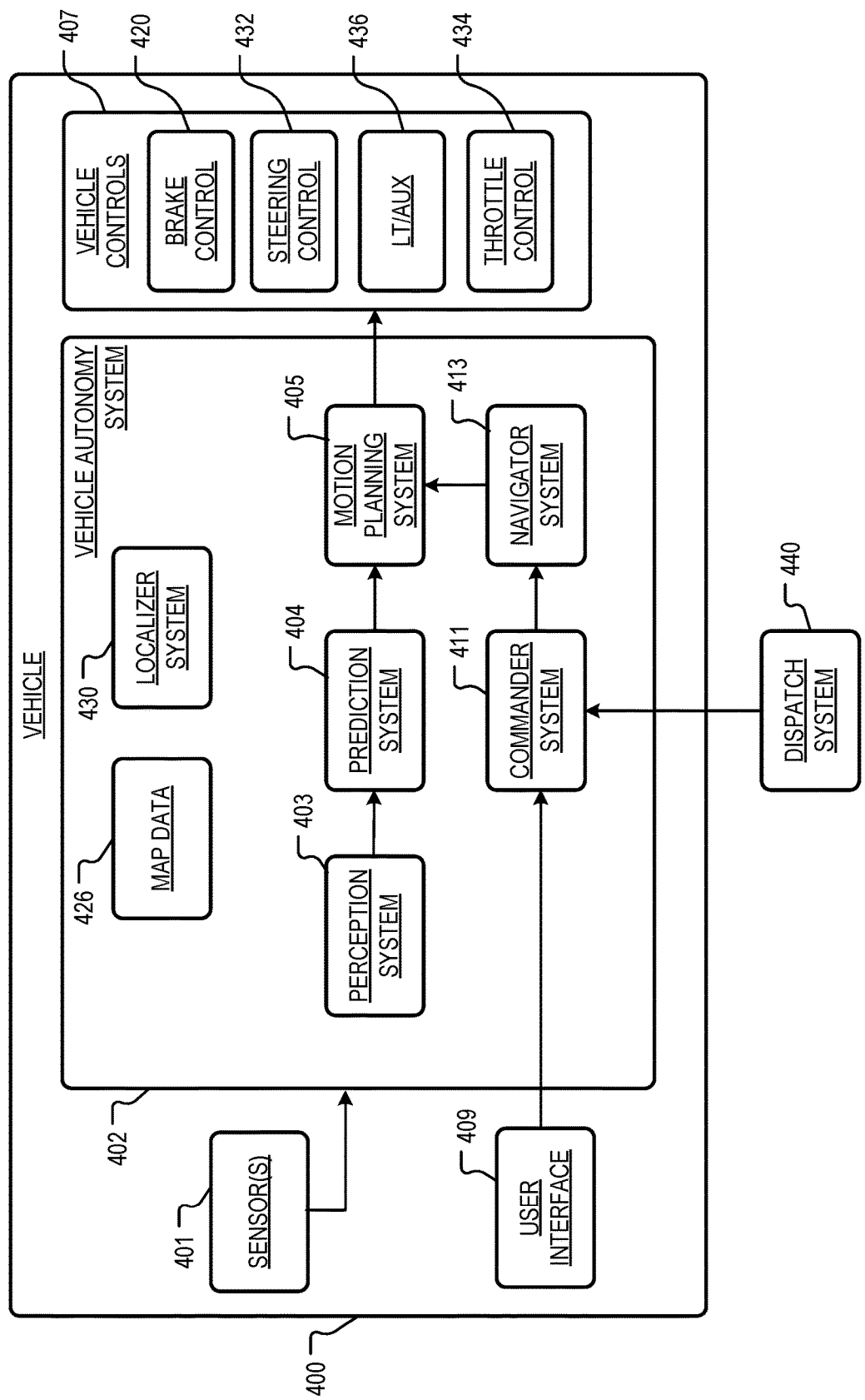
FIG. 4 depicts a block diagram of an example vehicle, according to example aspects of the present disclosure.

FIG. 4 depicts a block diagram of an example vehicle 400, according to example aspects of the present disclosure. The example vehicle 400 can describe the capturing vehicle 106 and/or a vehicle in which the AV SUT 102 is installed. The vehicle 400 includes one or more sensors 401, an autonomous vehicle control system 402, and one or more vehicle controls 407. The vehicle 400 is an autonomous vehicle, as described herein. The autonomous vehicle control system 402 is one example of how the AV SUT 102 can be implemented and installed in a vehicle. The example vehicle 400 shows just one example arrangement of an autonomous vehicle. In some examples, autonomous vehicles of different types can have different arrangements.

The autonomous vehicle control system 402 includes a commander system 411, a navigator system 413, a perception system 403, a prediction system 404, a motion planning system 405, and a localizer system 430 that cooperate to perceive the surrounding environment of the vehicle 400 and determine a motion plan for controlling the motion of the vehicle 400 accordingly.

The autonomous vehicle control system 402 is engaged to control the vehicle 400 or to assist in controlling the vehicle 400. In particular, the autonomous vehicle control system 402 receives sensor data from the one or more sensors 401, attempts to comprehend the environment surrounding the vehicle 400 by performing various processing techniques on data collected by the sensors 401, and generates an appropriate route through the environment. The autonomous vehicle control system 402 sends commands to control the one or more vehicle controls 407 to operate the vehicle 400 according to the route.

Various portions of the autonomous vehicle control system 402 receive sensor data from the one or more sensors 401. For example, the sensors 401 may include remote-detection sensors 108 as well as motion sensors such as an IMU, one or more encoders, or one or more odometers. The sensor data includes information that describes the location of objects within the surrounding environment of the vehicle 400, information that describes the motion of the vehicle 400, and so forth.

The sensors 401 may also include one or more remote-detection sensors 108 or sensor systems, such as a LIDAR, a RADAR, one or more cameras, and so forth. As one example, a LIDAR system of the one or more sensors 401 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 401 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 401 may generate sensor data (e.g., remote sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 401 can include a positioning system. The positioning system determines a current position of the vehicle 400. The positioning system can be any device or circuitry for analyzing the position of the vehicle 400. For example, the positioning system can determine a position by using one or more of inertial sensors, a satellite positioning system such as a GPS, based on Internet Protocol (IP) address, by using triangulation and/or proximity to network access points or other network components (e.g., cellular towers, WiFi access points), and/or other suitable techniques. The position of the vehicle 400 can be used by various systems of the autonomous vehicle control system 402.

Thus, the one or more sensors 401 are used to collect sensor data that includes information that describes the location (e.g., in three-dimensional space relative to the vehicle 400) of points that correspond to objects within the surrounding environment of the vehicle 400. In some implementations, the sensors 401 can be positioned at various different locations on the vehicle 400. As an example, in some implementations, one or more cameras and/or LIDAR sensors can be located in a pod or other structure that is mounted on a roof of the vehicle 400 while one or more RADAR sensors can be located in or behind the front and/or rear bumper(s) or body panel(s) of the vehicle 400. As another example, camera(s) can be located at the front or rear bumper(s) of the vehicle 400. Other locations can be used as well.

The localizer system 430 receives some or all of the sensor data from sensors 401 and generates vehicle poses for the vehicle 400. A vehicle pose describes a position and attitude of the vehicle 400. The vehicle pose (or portions thereof) can be used by various other components of the autonomous vehicle control system 402 including, for example, the perception system 403, the prediction system 404, the motion planning system 405, and the navigator system 413.

The position of the vehicle 400 is a point in a three-dimensional space. In some examples, the position is described by values for a set of Cartesian coordinates, although any other suitable coordinate system may be used. The attitude of the vehicle 400 generally describes the way in which the vehicle 400 is oriented at its position. In some examples, attitude is described by a yaw about the vertical axis, a pitch about a first horizontal axis, and a roll about a second horizontal axis. In some examples, the localizer system 430 generates vehicle poses periodically (e.g., every second, every half second). The localizer system 430 appends time stamps to vehicle poses, where the time stamp for a pose indicates the point in time that is described by the pose. The localizer system 430 generates vehicle poses by comparing sensor data (e.g., remote sensor data) to map data 426 describing the surrounding environment of the vehicle 400.

In some examples, the localizer system 430 includes one or more pose estimators and a pose filter. Pose estimators generate pose estimates by comparing remote-sensor data (e.g., LIDAR, RADAR) to map data 426. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 430 generates vehicle poses. Accordingly, the pose filter generates some vehicle poses by extrapolating from a previous pose estimate utilizing motion sensor data.

Vehicle poses and/or vehicle positions generated by the localizer system 430 are provided to various other components of the autonomous vehicle control system 402. For example, the commander system 411 may utilize a vehicle position to determine whether to respond to a call from a dispatch system 440.

The commander system 411 determines a set of one or more target locations that are used for routing the vehicle 400. The target locations are determined based on user input received via a user interface 409 of the vehicle 400. The user interface 409 may include and/or use any suitable input/output device or devices. In some examples, the commander system 411 determines the one or more target locations considering data received from the dispatch system 440. The dispatch system 440 is programmed to provide instructions to multiple vehicles, for example, as part of a fleet of vehicles for moving passengers and/or cargo. Data from the dispatch system 440 can be provided via a wireless network, for example.

The navigator system 413 receives one or more target locations from the commander system 411 and map data 426. Map data 426, for example, provides detailed information about the surrounding environment of the vehicle 400. Map data 426 provides information regarding identity and location of different roadways and roadway elements (e.g., represented as graph elements). A roadway is a place where the vehicle 400 can drive and may include, for example, a road, a street, a highway, a lane, a parking lot, or a driveway. Routing graph data 144 is a type of map data 426.

From the one or more target locations and the map data 426, the navigator system 413 generates test route data describing a route for the vehicle to take to arrive at the one or more target locations. In some implementations, the navigator system 413 determines test route data using one or more path planning algorithms based on costs for graph elements, as described herein. For example, a cost for a route can indicate a time of travel, risk of danger, or other factor associated with adhering to a particular candidate route. Test route data describing a test route is provided to the motion planning system 405, which commands the vehicle controls 407 to implement the route or route extension, as described herein. The navigator system 413 can generate routes as described herein using a general purpose routing graph and routing graph modification data 140. Also, in examples where test route data is received from a dispatch system 440, that test route data can also be provided to the motion planning system 405.

The perception system 403 detects objects in the surrounding environment of the vehicle 400 based on sensor data, map data 426, and/or vehicle poses provided by the localizer system 430. For example, map data 426 used by the perception system 403 describes roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data 426 that provides information that assists the autonomous vehicle control system 402 in comprehending and perceiving its surrounding environment and its relationship thereto.

In some examples, the perception system 403 determines state data for one or more of the objects in the surrounding environment of the vehicle 400. State data describes a current state of an object (also referred to as "features of the object"). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 400; minimum path to interaction with the vehicle 400; minimum time duration to interaction with the vehicle 400; and/or other state information.

In some implementations, the perception system 403 determines state data for each object over a number of iterations. In particular, the perception system 403 updates the state data for each object at each iteration. Thus, the perception system 403 detects and tracks objects, such as other vehicles, that are proximate to the vehicle 400 over time.

The prediction system 404 is configured to predict one or more future positions for an object or objects in the environment surrounding the vehicle 400 (e.g., an object or objects detected by the perception system 403). The prediction system 404 generates prediction data associated with one or more of the objects detected by the perception system 403. In some examples, the prediction system 404 generates prediction data describing each of the respective objects detected by the prediction system 404.

Prediction data for an object is indicative of one or more predicted future locations of the object. For example, the prediction system 404 may predict where the object will be located within the next 5 seconds, 20 seconds, 200 seconds, and so forth. Prediction data for an object may indicate a predicted trajectory (e.g., predicted path) for the object within the surrounding environment of the vehicle 400. For example, the predicted trajectory (e.g., path) can indicate a path along which the respective object is predicted to travel over time (and/or the speed at which the object is predicted to travel along the predicted path). The prediction system 404 generates prediction data for an object, for example, based on state data generated by the perception system 403. In some examples, the prediction system 404 also considers one or more vehicle poses generated by the localizer system 430 and/or map data 426.

In some examples, the prediction system 404 uses state data indicative of an object type or classification to predict a trajectory for the object. As an example, the prediction system 404 can use state data provided by the perception system 403 to determine that a particular object (e.g., an object classified as a vehicle) approaching an intersection and maneuvering into a left-turn lane intends to turn left. In such a situation, the prediction system 404 predicts a trajectory (e.g., path) corresponding to a left-turn for the vehicle 400 such that the vehicle 400 turns left at the intersection. Similarly, the prediction system 404 determines predicted trajectories for other objects, such as bicycles, pedestrians, parked vehicles, and so forth. The prediction system 404 provides the predicted trajectories associated with the object(s) to the motion planning system 405.

In some implementations, the prediction system 404 is a goal-oriented prediction system 404 that generates one or more potential goals, selects one or more of the most likely potential goals, and develops one or more trajectories by which the object can achieve the one or more selected goals. For example, the prediction system 404 can include a scenario generation system that generates and/or scores the one or more goals for an object and a scenario development system that determines the one or more trajectories by which the object can achieve the goals. In some implementations, the prediction system 404 can include a machine-learned goal-scoring model, a machine-learned trajectory development model, and/or other machine-learned models.

The motion planning system 405 commands the vehicle controls 407 based, at least in part, on the predicted trajectories associated with the objects within the surrounding environment of the vehicle 400, the state data for the objects provided by the perception system 403, vehicle poses provided by the localizer system 430, map data 426, and route or route extension data provided by the navigator system 413. Stated differently, given information about the current locations of objects and/or predicted trajectories of objects within the surrounding environment of the vehicle 400, the motion planning system 405 determines control commands for the vehicle 400 that best navigate the vehicle 400 along the route or route extension relative to the objects at such locations and their predicted trajectories on acceptable roadways.

In some implementations, the motion planning system 405 can also evaluate one or more cost functions and/or one or more reward functions for each of one or more candidate control commands or sets of control commands for the vehicle 400. Thus, given information about the current locations and/or predicted future locations/trajectories of objects, the motion planning system 405 can determine a total cost (e.g., a sum of the cost(s) and/or reward(s) provided by the cost function(s) and/or reward function(s)) of adhering to a particular candidate control command or set of control commands. The motion planning system 405 can select or determine a control command or set of control commands for the vehicle 400 based, at least in part, on the cost function(s) and the reward function(s). For example, the motion plan that minimizes the total cost can be selected or otherwise determined.

In some implementations, the motion planning system 405 can be configured to iteratively update the route or route extension for the vehicle 400 as new sensor data is obtained from one or more sensors 401. For example, as new sensor data is obtained from one or more sensors 401, the sensor data can be analyzed by the perception system 403, the prediction system 404, and the motion planning system 405 to determine the motion plan.

The motion planning system 405 can provide control commands to one or more vehicle controls 407. For example, the one or more vehicle controls 407 can include throttle systems, brake systems, steering systems, and other control systems, each of which can include various vehicle controls (e.g., actuators or other devices that control gas flow, steering, braking) to control the motion of the vehicle 400. The various vehicle controls 407 can include one or more controllers, control devices, motors, and/or processors.

The vehicle controls 407 include a brake control module 420. The brake control module 420 is configured to receive a braking command and bring about a response by applying (or not applying) the vehicle brakes. In some examples, the brake control module 420 includes a primary system and a secondary system. The primary system receives braking commands and, in response, brakes the vehicle 400. The secondary system may be configured to determine a failure of the primary system to brake the vehicle 400 in response to receiving the braking command.

A steering control system 432 is configured to receive a steering command and bring about a response in the steering mechanism of the vehicle 400. The steering command is provided to a steering system to provide a steering input to steer the vehicle 400.

A lighting/auxiliary control module 436 receives a lighting or auxiliary command. In response, the lighting/auxiliary control module 436 controls a lighting and/or auxiliary system of the vehicle 400. Controlling a lighting system may include, for example, turning on, turning off, or otherwise modulating headlights, parking lights, running lights, and so forth. Controlling an auxiliary system may include, for example, modulating windshield wipers, a defroster, and so forth.

A throttle control system 434 is configured to receive a throttle command and bring about a response in the engine speed or other throttle mechanism of the vehicle. For example, the throttle control system 434 can instruct an engine and/or engine controller, or other propulsion system component, to control the engine or other propulsion system of the vehicle 400 to accelerate, decelerate, or remain at its current speed.

Each of the perception system 403, the prediction system 404, the motion planning system 405, the commander system 411, the navigator system 413, and the localizer system 430 can be included in or otherwise be a part of an autonomous vehicle control system 402 configured to control the vehicle 400 based, at least in part, on data obtained from one or more sensors 401. For example, data obtained by one or more sensors 401 can be analyzed by each of the perception system 403, the prediction system 404, and the motion planning system 405 in a consecutive fashion in order to control the vehicle 400. While FIG. 4 depicts elements suitable for use in an autonomous vehicle control system 402 according to example aspects of the present disclosure, one of ordinary skill in the art will recognize that other autonomous vehicle control systems can be configured to control an autonomous vehicle based on sensor data.

The autonomous vehicle control system 402 includes one or more computing devices, which may implement all or parts of the perception system 403, the prediction system 404, the motion planning system 405 and/or the localizer system 430. Descriptions of hardware and software configurations for computing devices to implement the autonomous vehicle control system 402 are provided herein at FIGS. 7 and 8.

Figure 5:
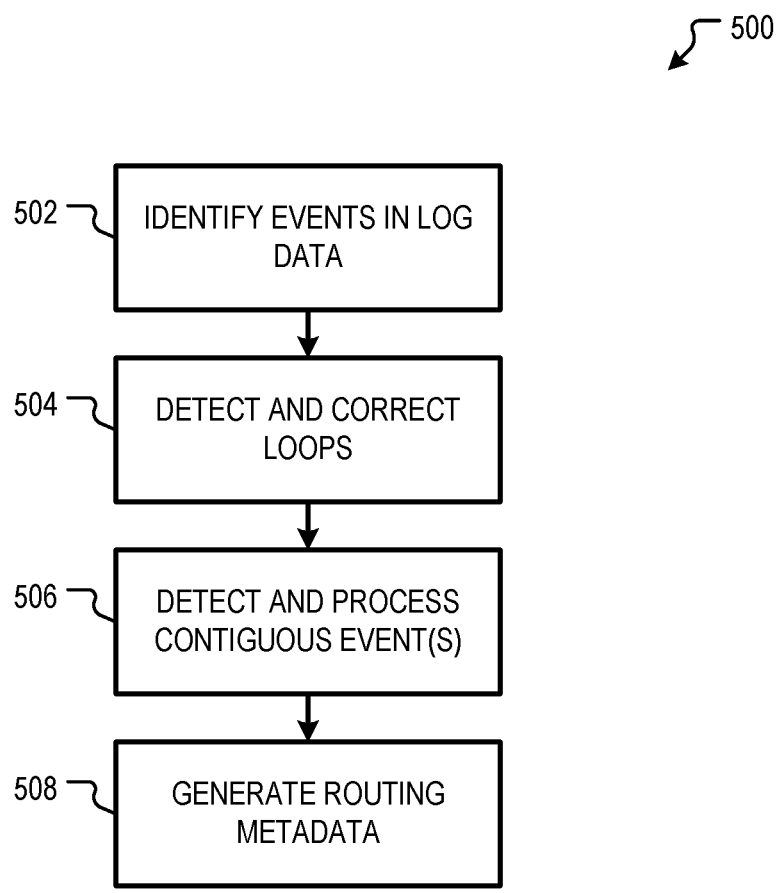
FIG. 5 is a flowchart showing one example of a process flow that can be executed by a testing utility to test an AV SUT using log data generated by a capturing vehicle.

FIG. 5 is a flowchart showing one example of a process flow 500 that can be executed by a testing utility, such as the testing utility 104, to test an AV SUT, such as the AV SUT 102, using log data 110 generated by a capturing vehicle 106.

At operation 502, the testing utility 104 identifies events described by the log data 110. Events can be detected in any suitable manner. For example, the testing utility 104 may examine log data 110 to identify event start times and event end times. An event start time may be detected when the log data 110 indicates that a new target was selected for the capturing vehicle 106, that a new route is provided for the capturing vehicle 106, that the capturing vehicle 106 has begun to move, or that a localizer component at the capturing vehicle 106 has provided a pose. In other examples, event start times can be detected, for example, upon the performance of a specified maneuver (e.g., unprotected left), when a perception component and/or prediction component at the capturing vehicle 106 detects a particular object or particular object behavior, etc. An event end time may be detected when the log data 110 indicates, for example, that the route execution status at the capturing vehicle 106 indicates an end of the route, a dropout of the poses provided by a localizer component at the capturing vehicle 106, etc.

At operation 504, the testing utility 104 detects and corrects route loops in the driven route at or near the time of the events detected at operation 502. That can include, for example, examining the driven route of the capturing vehicle 106 during and/or around the detected events to determine if any graph element or graph elements were driven twice. If a route loop is detected, the testing utility 104 corrects the route loop, for example, by route chunking or by adding a waypoint, as described herein.

At operation 506, the testing utility 104 detects and processes contiguous events. Contiguous events are events that occur on the driven route either consecutively or within a threshold time of one another. As described herein, in some examples, routing metadata for an event may be extended before an event start time and after an event end time. Contiguous events may be events with extensions that overlap or are within a threshold time of one another. When contiguous events are detected, the testing utility 104 may merge or overlap the contiguous events, for example, by considering the contiguous events to be a single event from the first-occurring event's start point to the last-occurring event's end point. If the combined events include a route loop, the testing utility 104 may add a waypoint indicator between contiguous events that include a route loop.

At operation 508, the testing utility 104 generates routing metadata describing the driven route of the capturing vehicle 106 at or around the detected event or events. The routing metadata, as described herein, can include, for example, a sequence of graph elements, a sequence of geographic locations, or another suitable positive expression of the driven route at or around the event. The routing metadata may be written to the log data 110, for example, at a routing metadata channel 120 as described herein.

Figure 6:
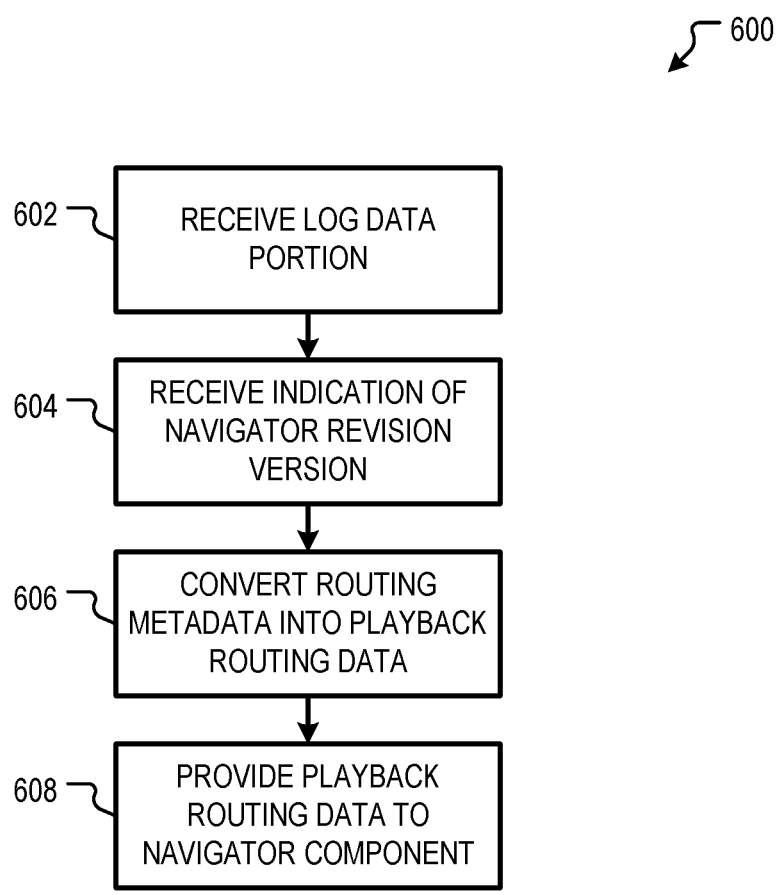
FIG. 6 is a flowchart showing one example of a process flow that can be executed by a testing utility to play back a log data portion to the AV SUT.

FIG. 6 is a flowchart showing one example of a process flow 600 that can be executed by a testing utility, such as the testing utility 104, to play-back a log data portion 129 to the AV SUT 102. At operation 602, the testing utility 104 receives a log data portion, such as the log data portion 129. The log data portion 129 may include routing metadata, as described herein and with respect to FIG. 5. In other examples, the log data portion 129 may not include routing metadata. For example, the testing utility 104 may generate routing metadata at playback time and/or may convert location data directly to playback routing data including target data 142 and/or routing graph modification data 140.

At operation 604, the testing utility 104 receives an indication of a version of the navigator component 126. The testing utility 104 may generate playback routing data in a format and/or syntax expected by the navigator component 126 from the commander component 131 or other suitable input component at the AV SUT 102. At operation 606, the testing utility 104 converts the routing metadata of the log data portion 129 to playback routing data, for example, as described herein. The playback routing data may include target data 142 describing one or more route targets and, in some examples, one or more waypoints. The playback routing data may also include routing data including one or more routing graph modifications. At operation 608, the testing utility 104 provides the playback routing data to the navigator component 126. During and/or after the playback routing data is provided to the navigator component 126, other portions of the log data portion 129 including, for example, sensor data and, in some examples, some or all control message traffic, is provided to the AV SUT 102. Outputs of the AV SUT 102, including commands, telemetry, and message traffic between components may be stored for later analysis.

Figure 7:
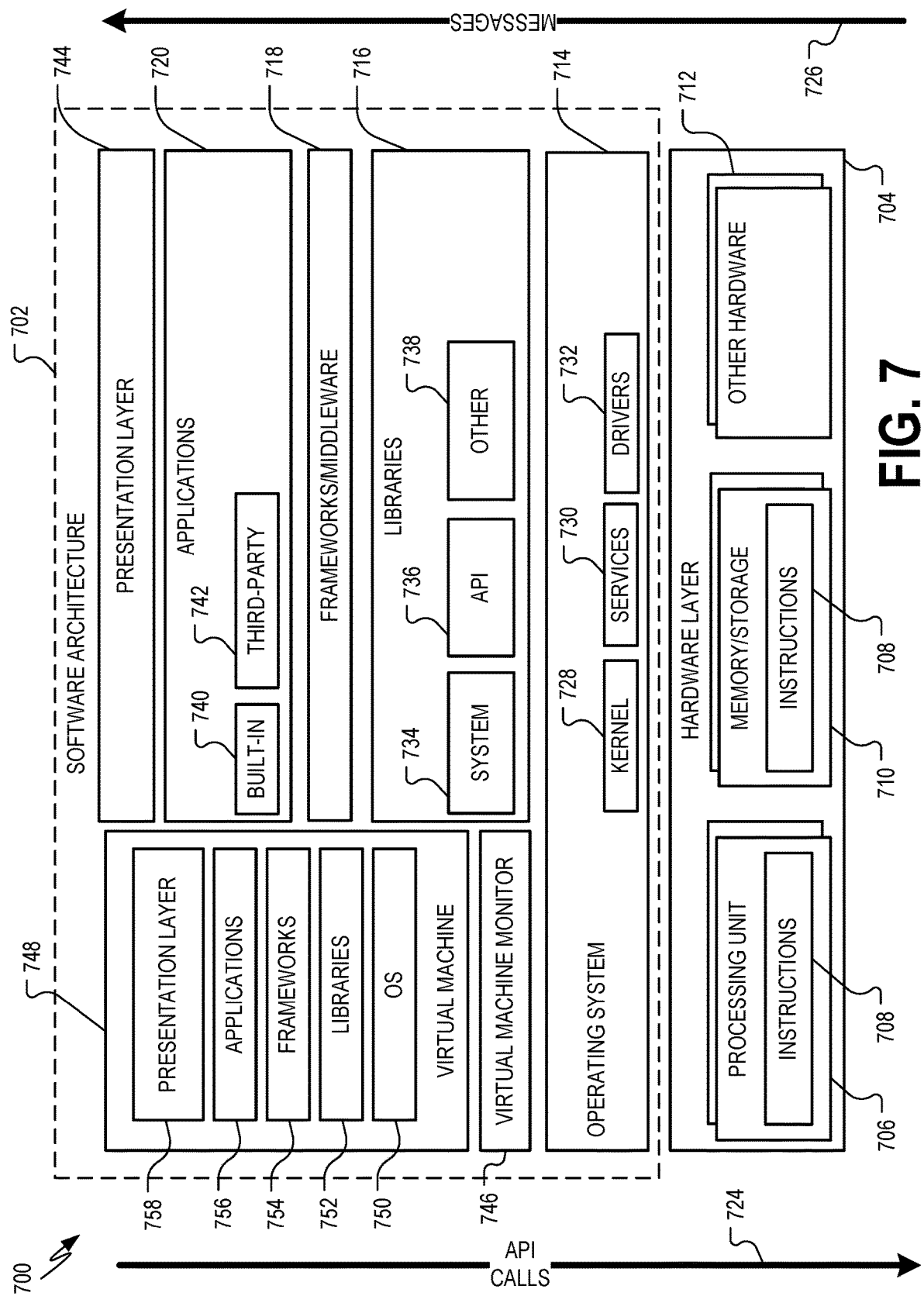
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture 702, and many other architectures may be implemented to facilitate the functionality described herein. A representative hardware layer 704 is illustrated and can represent, for example, any of the above-referenced computing devices. In some examples, the hardware layer 704 may be implemented according to an architecture 800 of FIG. 8 and/or the software architecture 702 of FIG. 7.

The representative hardware layer 704 comprises one or more processing units 706 having associated executable instructions 708. The executable instructions 708 represent the executable instructions of the software architecture 702, including implementation of the methods, modules, components, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the architecture 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature, and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the software architecture 702 to pause its current processing and execute an interrupt service routine (ISR) when an interrupt is received. The ISR may generate an alert.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), WiFi® drivers, near-field communication (NFC) drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be used by the applications 720 and/or other software components/modules. For example, the frameworks 718 may provide various graphical user interface (GUI) functions, high-level resource management, high-level location services, and so forth. The frameworks 718 may provide a broad spectrum of other APIs that may be used by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 742 may invoke the API calls 724 provided by the mobile operating system such as the operating system 714 to facilitate functionality described herein.

The applications 720 may use built-in operating system functions (e.g., kernel 728, services 730, and/or drivers 732), libraries (e.g., system libraries 734, API libraries 736, and other libraries 738), or frameworks/middleware 718 to create user interfaces 409 to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 7, this is illustrated by a virtual machine 748. A virtual machine creates a software environment where applications 720/modules can execute as if they were executing on a hardware computing device. The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Figure 8:
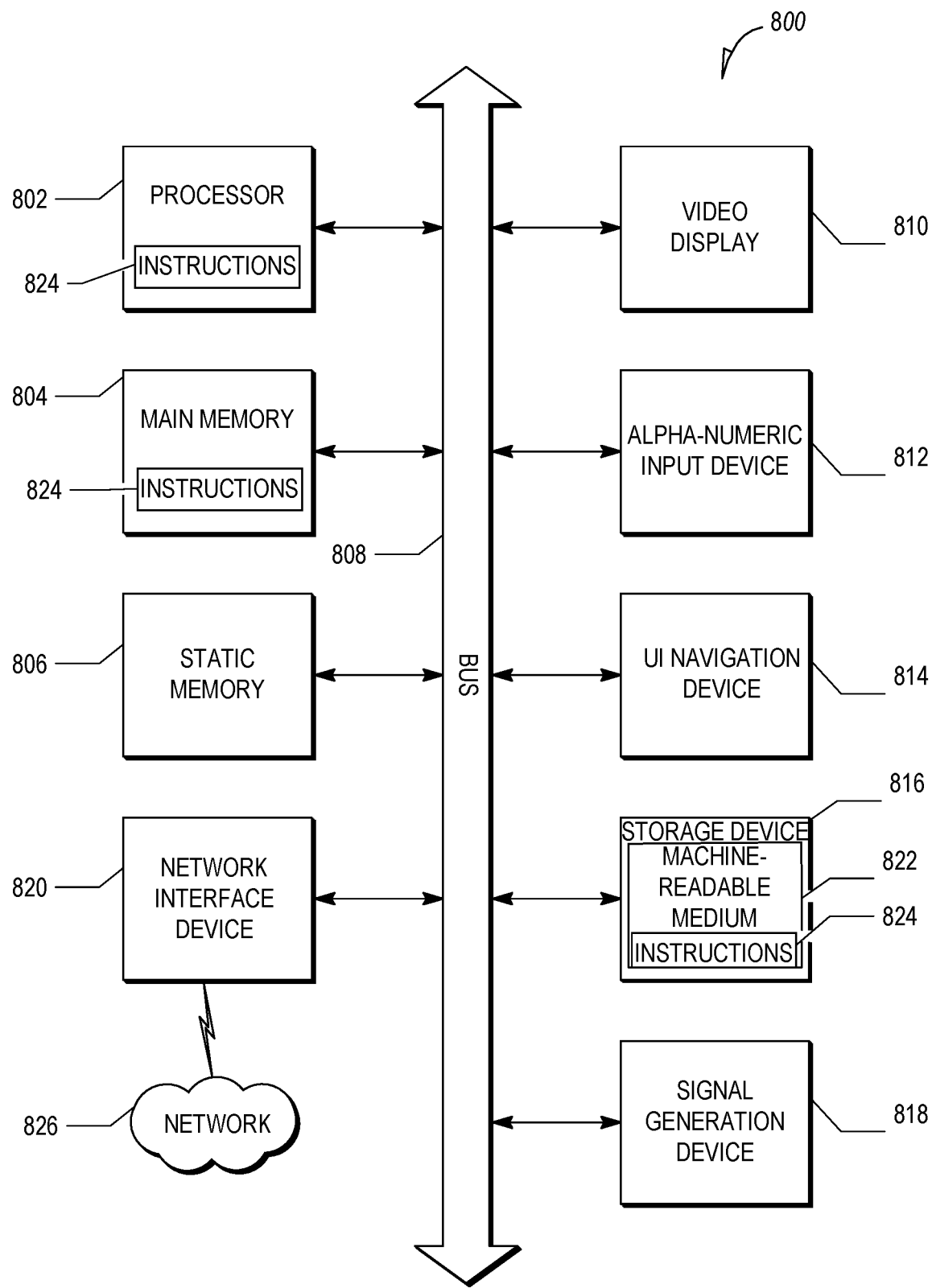
FIG. 8 is a block diagram illustrating a computing device hardware architecture, within which a set or sequence of instructions can be executed to cause a machine to perform examples of any one of the methodologies discussed herein.

FIG. 8 is a block diagram illustrating a computing device hardware architecture 800, within which a set or sequence of instructions 708 can be executed to cause a machine to perform examples of any one of the methodologies discussed herein. The hardware architecture 800 describes a computing device for executing the vehicle autonomy system described herein.

The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions 708 (sequential or otherwise) that specify operations to be taken by that machine.

The example architecture 800 includes a processor unit 802 comprising at least one processor (e.g., a central processing unit (CPU), a graphics processing unit (GPU), or both, processor cores, compute nodes). The architecture 800 may further comprise a main memory 804 and a static memory 806, which communicate with each other via a link 808 (e.g., a bus). The architecture 800 can further include a video display unit 810, an input device 812 (e.g., a keyboard), and a UI navigation device 814 (e.g., a mouse). In some examples, the video display unit 810, input device 812, and UI navigation device 814 are incorporated into a touchscreen display. The architecture 800 may additionally include a storage device 816 (e.g., a drive unit), a signal generation device 818 (e.g., a speaker), a network interface device 820, and one or more sensors 401 (not shown), such as a Global Positioning System (GPS) sensor, compass, accelerometer, or other sensor.

In some examples, the processor unit 802 or another suitable hardware component may support a hardware interrupt. In response to a hardware interrupt, the processor unit 802 may pause its processing and execute an ISR, for example, as described herein.

The storage device 816 includes a machine-readable medium 822 on which is stored one or more sets of data structures and instructions 824 (e.g., software) embodying or used by any one or more of the methodologies or functions described herein. The instructions 824 can also reside, completely or at least partially, within the main memory 804, within the static memory 806, and/or within the processor unit 802 during execution thereof by the architecture 800, with the main memory 804, the static memory 806, and the processor unit 802 also constituting machine-readable media 822.

Executable Instructions and Machine-Storage Medium

The various memories (i.e., 804, 806, and/or memory of the processor unit(s) 802) and/or the storage device 816 may store one or more sets of instructions and data structures (e.g., the instructions 824) embodying or used by any one or more of the methodologies or functions described herein. These instructions 824, when executed by the processor unit(s) 802, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions 824 and/or data, as well as cloud-based storage systems or storage networks that include multiple storage apparatus or devices. The terms shall accordingly be taken to include, but not be limited to, solid-state memories, and optical and magnetic media, including memory internal or external to processors 802. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 can further be transmitted or received over a communications network 826 using a transmission medium via the network interface device 820 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions 824 that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A computer-implemented method for testing an autonomous vehicle control system in a test environment comprising at least one computing device, the method comprising:
    receiving, by a testing utility executing at the at least one computing device, log data describing a driven route executed by a capturing vehicle, the log data comprising sensor data received by at least one sensor of the capturing vehicle on the driven route and location data describing locations of the capturing vehicle on the driven route, the locations comprising a first location of the capturing vehicle at a first driven route time and a second location of the capturing vehicle at a second drive route time;
    determining, by the testing utility, a first routing graph modification to constrain a navigator software component executing at the autonomous vehicle control system under test, the first routing graph modification determined using at least the location data to constrain the navigator software component to generate testing routes that are within a sensor coverage area of the log data, the sensor coverage area describing an area from which the capturing vehicle gathered sensor data on the driven route, the first routing graph modification describing at least one of:
        a change to a connection between a first graph element of a routing graph and a second graph element of the routing graph, the change to the connection being to prevent routing from the first graph element to the second graph element, or
        a change to a cost of traversing at least a portion of the routing graph;
    accessing, by the navigator software component, the first routing graph modification determined by the testing utility;
    generating, by the navigator software component, a testing route in response to the log data, the testing route being based at least in part on the first routing graph modification determined by the testing utility and comprising the first graph element of the routing graph that corresponds to the first location at a first test time corresponding to the first driven route time;
    providing, by the navigator software component, data describing the testing route to the autonomous vehicle control system under test executing at the at least one computing device;
    storing, by the testing utility at, an output of at least one component of the autonomous vehicle control system under test, the output generated using the testing route from the navigator software component using the first routing graph modification; and
    controlling an autonomous vehicle using an autonomous vehicle control system that is based at least in part on the output generated using the testing utility.

2. The method of claim 1, further comprising generating routing metadata, the routing metadata comprising a description of where the capturing vehicle was located while on the driven route.

3. The method of claim 1, further comprising identifying an event from the log data, the event beginning at an event start time and ending at an event end time, wherein the first driven route time is between the event start time and the event end time.

4. The method of claim 3, further comprising generating a log data portion, the log data portion describing at least a part of the driven route of the capturing vehicle including the event.

5. The method of claim 4, wherein the log data portion describes a portion of the driven route between a log data portion start time prior to the event start time and a log data portion end time after the event end time.

6. The method of claim 4, further comprising:
    determining that a location of the capturing vehicle at an end of the log data portion was within a threshold distance from a location of the capturing vehicle at a beginning of a second log data portion; and
    generating a combined log data portion comprising the log data portion and the second log data portion.

7. The method of claim 1, wherein the first location describes a single graph element.

8. The method of claim 1, wherein the first location describes a plurality of graph elements, the plurality of graph elements describing roadway elements that are part of a common roadway.

9. A test environment system for testing an autonomous vehicle control system, the test environment system comprising:
    at least one processor unit; and
    a data storage medium comprising instructions thereon that, when executed by the at least one processor unit, cause the at least one processor unit to perform operations comprising:
    receiving, by a testing utility executing at the at least one processor unit, log data describing a driven route executed by a capturing vehicle, the log data comprising sensor data received by at least one sensor of the capturing vehicle on the driven route and location data describing locations of the capturing vehicle on the driven route, the locations comprising a first location of the capturing vehicle at a first driven route time and a second location of the capturing vehicle at a second drive route time;
    determining, by the testing utility, a first routing graph modification to constrain a navigator software component executing at the autonomous vehicle control system under test, the first routing graph modification determined using at least the location data to constrain the navigator software component to generate testing routes that are within a sensor coverage area of the log data, the sensor coverage area describing an area from which the capturing vehicle gathered sensor data on the driven route, the first routing graph modification describing at least one of:
        a change to a connection between a first graph element of a routing graph and a second graph element of the routing graph, change to the connection being to prevent routing from the first graph element to the second graph element, or a change to a cost of traversing at least a portion of the routing graph;

accessing, by the navigator software component, the first routing graph modification determined by the testing utility;

generating, by the navigator software component under test, a testing route in response to the log data, the testing route being based at least in part on the first routing graph modification determined by the testing utility and comprising a graph element corresponding to the first location at a first test time of the routing graph that corresponds to the first driven route time;

storing an output of at least one component of the autonomous vehicle control system under test, the output generated using the testing route from the navigator software component using the first routing graph modification; and controlling an autonomous vehicle using an autonomous vehicle control system that is based at least in part on the output generated using the testing utility.

10. The system of claim 9, the operations further comprising generating routing metadata, the routing metadata comprising a description of where the capturing vehicle was located while on the driven route.

11. The system of claim 9, the operations further comprising identifying an event from the log data, the event beginning at an event start time and ending at an event end time, wherein the first driven route time is between event start time and the event end time.

12. The system of claim 11, the operations further comprising generating a log data portion, the log data portion describing at least part of the driven route of the capturing vehicle including the event.

13. The system of claim 12, wherein the log data portion describes a portion of the driven route between a log data portion start time prior to the event start time and a log data portion end time after the event end time.

14. The system of claim 12, the operations further comprising:

determining that a location of the capturing vehicle at an end of the log data portion was within a threshold distance from a location of the capturing vehicle at a beginning of a second log data portion; and generating a combined log data portion comprising the log data portion and the second log data portion.

15. The system of claim 9, wherein the first location describes a single graph element.

16. The system of claim 9, wherein the first location describes a plurality of graph elements, the plurality of graph elements describing roadway elements that are part of a common roadway.

17. A non-transitory machine-readable storage medium comprising instructions thereon that, when executed in a test environment comprising at least one processor, cause the at least one processor to perform operations comprising:

receiving, by a testing utility executing at the at least one processor, log data describing a driven route executed by a capturing vehicle, the log data comprising sensor data received by at least one sensor of the capturing vehicle on the driven route and location data describing locations of the capturing vehicle on the driven route, the locations comprising a first location of the capturing vehicle at a first driven route time and a second location of the capturing vehicle at a second drive route time;

determining, by the testing utility, a first routing graph modification to constrain a navigator software component executing at an autonomous vehicle control system under test, the first routing graph modification determined using at least the location data to constrain the navigator software component to generate testing routes that are within a sensor coverage area of the log data, the sensor coverage area describing an area from which the capturing vehicle gathered sensor data on the driven route, the first routing graph modification describing at least one of:

a change to a connection between a first graph element of a routing graph and a second graph element of the routing graph, change to the connection being to prevent routing from the first graph element to the second graph element, or a change to a cost of traversing at least a portion of the routing graph;

accessing, by the navigator software component, the first routing graph modification determined by the testing utility;

generating, by the navigator software component, a testing route in response to the log data, the testing route being based at least in part on the first routing graph modification determined by the testing utility and comprising a graph element of the routing graph that corresponds to the first location at a first test time corresponding to the first driven route time;

storing an output of at least one component of the autonomous vehicle control system under test, the output generated using the testing route from the navigator software component using the first routing graph modification; and controlling an autonomous vehicle using an autonomous vehicle control system that is based at least in part on the output generated using the testing utility.

18. The non-transitory machine-readable storage medium of claim 17, the operations further comprising: generating routing metadata, the routing metadata comprising a description of where the capturing vehicle was located while on the driven route.

19. The non-transitory machine-readable storage medium of claim 17, the operations further comprising identifying an event from the log data, the event beginning at an event start time and ending at an event end time, wherein the first driven route time is between the event start time and the event end time.

20. The non-transitory machine-readable storage medium of claim 19, the operations further comprising generating a log data portion, the log data portion describing at least a part of the driven route of the capturing vehicle including the event.

* * * * *